United States Patent
Irie

(10) Patent No.: US 8,694,809 B2
(45) Date of Patent: *Apr. 8, 2014

(54) DEDICATED POWER SUPPLY APPARATUS, TERMINAL, POWER SUPPLY SYSTEM, AND POWER SUPPLY METHOD

(75) Inventor: Kenji Irie, Tokyo (JP)

(73) Assignee: Sony Corporation, Tokyo (JP)

( * ) Notice: Subject to any disclaimer, the term of this patent is extended or adjusted under 35 U.S.C. 154(b) by 16 days.

This patent is subject to a terminal disclaimer.

(21) Appl. No.: 13/335,567

(22) Filed: Dec. 22, 2011

(65) Prior Publication Data

US 2012/0091984 A1    Apr. 19, 2012

Related U.S. Application Data

(63) Continuation of application No. 12/610,797, filed on Nov. 2, 2009, now Pat. No. 8,103,886, which is a continuation of application No. 11/508,832, filed on Aug. 24, 2006, now Pat. No. 7,631,203.

(30) Foreign Application Priority Data

Aug. 31, 2005 (JP) .................. 2005-251543

(51) Int. Cl.
*G06F 1/26* (2006.01)
(52) U.S. Cl.
USPC ........................... 713/310; 713/340; 320/107
(58) Field of Classification Search
USPC ................. 713/300, 310, 330, 340
See application file for complete search history.

(56) References Cited

U.S. PATENT DOCUMENTS

| 5,818,197 | A | 10/1998 | Miller et al. |
| 6,184,660 | B1 | 2/2001 | Hatular |
| 7,631,203 | B2 | 12/2009 | Irie |
| 8,103,886 | B2 * | 1/2012 | Irie .............................. 713/310 |
| 2004/0251878 | A1 | 12/2004 | Veselic |
| 2006/0181241 | A1 | 8/2006 | Veselic |

FOREIGN PATENT DOCUMENTS

| JP | 2005-6497 | 1/2005 |
| JP | 2005-86933 | 3/2005 |
| JP | 2005-209057 | 8/2005 |

OTHER PUBLICATIONS

Official communication from Japanese Patent Office, dated Aug. 10, 2010, issued in counterpart JP Application No. 2005-251543 (3 pages).

* cited by examiner

*Primary Examiner* — Dennis M Butler
(74) *Attorney, Agent, or Firm* — Finnegan, Henderson, Farabow, Garrett & Dunner, L.L.P.

(57) ABSTRACT

Disclosed is a physical processor. The processor is connected to an electronic device. The electronic device includes a rechargeable battery, a connector, and operation unit. The processor is configured to: determine whether an external device is a predetermined power supply apparatus; control communication with the external device so that the rechargeable battery is charged by a first current from the external device when the external device is the predetermined power supply apparatus; and control communication with the external device so that the rechargeable battery is charged by a second current from the external device when the external device is not the predetermined power supply apparatus. The second current is greater than the first current. The processor is further configured to control to playback content data stored in the electronic device based on a command from the operation unit by using power of the rechargeable battery.

12 Claims, 10 Drawing Sheets

FIG. 4

| | R11 | R12 | R21 | R22 | D+ | D− | RESULT |
|---|---|---|---|---|---|---|---|
| A | OPEN | OPEN | OPEN | OPEN | HIGH-Z | HIGH-Z | CHARGING (ACTUALLY UNSTABLE) |
| B | O | OPEN | OPEN | OPEN | HIGH | HIGH-Z | CHARGING |
| C | O | OPEN | OPEN | OPEN | HIGH | HIGH-Z | CHARGING |
| D | OPEN | OPEN | O | OPEN | HIGH-Z | HIGH | CHARGING |
| E | OPEN | OPEN | OPEN | O | HIGH-Z | LOW | SUSPENDED |
| F | O | OPEN | O | OPEN | HIGH | HIGH | CHARGING |
| G | O | OPEN | OPEN | O | HIGH | LOW | SUSPENDED |
| H | OPEN | O | O | OPEN | LOW | HIGH | CHARGING |
| I | OPEN | O | OPEN | O | LOW | LOW | SUSPENDED |

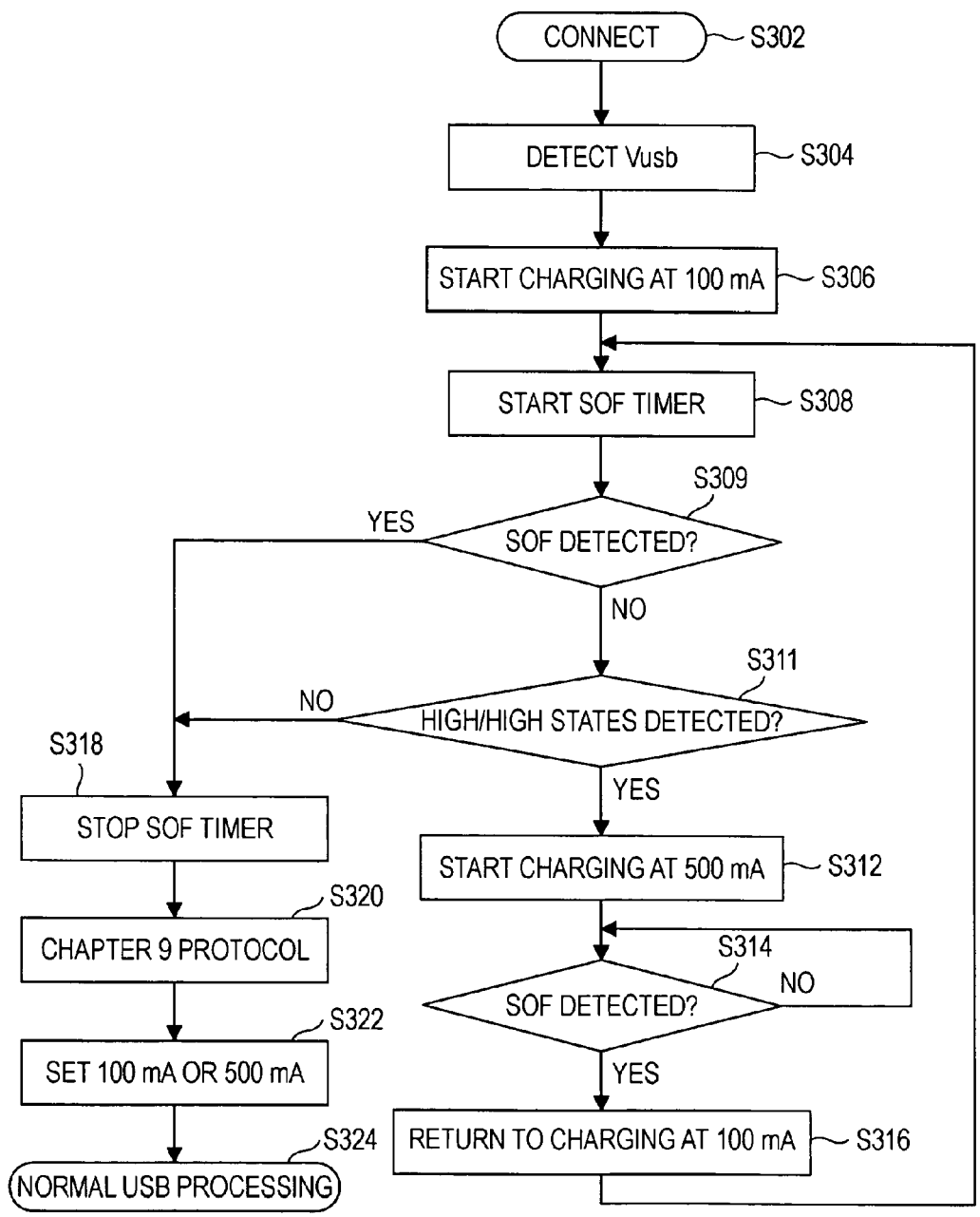

DEDICATED POWER SUPPLY APPARATUS, TERMINAL, POWER SUPPLY SYSTEM, AND POWER SUPPLY METHOD

CROSS-REFERENCES TO RELATED APPLICATIONS

This is a continuation of application Ser. No. 12/610,797, filed Nov. 2, 2009 now U.S. Pat. No. 8,103,886, which is a continuation of application Ser. No. 11/508,832, filed Aug. 24, 2006 now U.S. Pat. No. 7,631,203, which claims the benefit of priority from prior Japanese Patent Publication No. JP 2005-251543, filed in Japan on Aug. 31, 2005, the entire contents of which are incorporated by reference.

BACKGROUND OF THE INVENTION

1. Field of the Invention

The present invention relates to dedicated power supply apparatuses, terminals, power supply systems, and power supply methods, and in particular, to a power supply technique applicable to mobile devices that can be carried around.

2. Description of the Related Art

A rapidly increasing number of mobile devices, such as digital audio players, that are small and can be carried around are being widely used. Many of these mobile devices are capable of performing high-speed data communication with computers by establishing universal serial bus (USB) connections. There are various methods for charging a battery in such a mobile device. For example, one method uses an alternating current (AC) jack for power supply, another method uses a cradle, and yet another method uses a USB. When a mobile device is provided with a USB terminal for data communication and an AC jack for power supply, the device becomes larger in size and is thus not attractive in appearance, and wiring connections become complicated. There are some mobile devices that are provided with cradles serving as dedicated chargers for holding and charging the mobile devices. Because it is necessary to have such large cradles at all times, it is difficult to make full use of the convenience of small mobile devices.

In view of the above-described points, it is preferable that USB-connectable mobile devices be charged by establishing USB connections. When charging is done by establishing USB connections, mobile devices can be charged by simply connecting them to computers. Therefore, many mobile devices that can be charged by establishing USB connections are not provided with an AC jack for power supply but are provided with only a USB jack for data communication and charging in order to reduce the size of the mobile devices, to not ruin the appearance of the mobile devices, and to enhance the simplicity of wiring connections.

In the case of mobile devices that are not provided with AC jacks for power supply, it is difficult to charge such a mobile device when there is no computer. In normal usage, such a mobile device is convenient since it can be charged by connecting it via USB to a computer. However, if a user of such a mobile device is on a trip and has no computer on hand, it is difficult to charge such a mobile device. In order to prevent this problem, adapters that can be connected to a home power supply, convert this power to predetermined power, and supply the predetermined power to mobile devices by establishing USB connections have been developed. Such adapters are referred to as "USB adapters" (for example, see Japanese Unexamined Patent Application Publication No. 2005-6497).

SUMMARY OF THE INVENTION

Known USB adapters described above employ a standard four-pin USB connector provided with a total of four terminals. The four terminals include a +5 power supply terminal for power supply, a ground terminal, a D+ terminal for data transmission, and a D− terminal for data transmission. According to the power supply specification of such USB adapters, an output voltage of 5 V±0.25 V and an output current of 500 mA are necessary, and the power supply terminal is designed to satisfy the specification. In contrast, the D+ and D− terminals for data transmission are open, and nothing has been done in this regard. Thus, the operation of the D+ and D− terminals is unstable.

When establishing a connection between a mobile device and a USB adapter, it is necessary for the mobile device not to mistakenly recognize that the USB adapter has been suspended. When the mobile device mistakenly recognizes that the USB adapter has been suspended, the mobile device can only receive power of 500 μA or less from the USB adapter. In known USB adapters, however, nothing has been done for the D+ and D− terminals for data transmission, and hence the mobile device may mistakenly recognize that the USB adapter has been suspended.

In view of the above-described problems, it is desirable to provide a dedicated power supply apparatus, a terminal, a power supply system, and a power supply method capable of providing a safe charging system and suppressing malfunction or unstable operation of the terminal while the dedicated power supply apparatus is being connected.

According to an embodiment of the present invention, there is provided a dedicated power supply apparatus for supplying power to a rechargeable power source or the like in a mobile device. The dedicated power supply apparatus includes a regulator that receives power from an external power source, two signal lines to which the regulator is connected, and two resistors, each placed between the regulator and an associated one of the signal lines.

With this structure, the two signal lines can be pulled up to a predetermined voltage by placing each of the two resistors between the regulator and an associated one of the two signal lines. Accordingly, a device connected to the dedicated power supply apparatus is prevented from mistakenly recognizing that the dedicated power supply apparatus has been suspended, and this device is thereby prevented from being suspended. Thus, malfunction or unstable operation of the device can be suppressed, and a safe charging system can be provided.

Each of the two resistors may not necessarily be placed between the regulator and an associated one of the two signal lines. For example, there are some cases where a resistor is placed between the regulator and at least one of the signal lines. That is, there are two types of USB devices. One is low-speed devices, such as a mouse, and the other is full-speed devices, such as a hard disk. By connecting the two resistors to the associated two signal lines, both types of USB devices can be handled. In order to handle only one type of USB device, such as low-speed devices or full-speed devices, a resistor may be connected to only one signal line. This point will be described subsequently.

According to another embodiment of the present invention, there is provided a terminal including a rechargeable power source or the like and receiving power from an external device. The terminal includes a connection portion to be connected to an external device, a battery that receives power from the external device via the connection portion, a detector that detects a data signal from the external device when the connection portion is connected to the external device, a determination unit that determines whether the external device is a dedicated power supply apparatus on the basis of a detection result obtained by the detector, and a controller that controls charging of the battery on the basis of a determination result obtained by the determination unit.

The data signal from the external device may be a signal indicating that the external device performs data communication.

The terminal may further include a current converter that converts, on the basis of determination performed by the determination unit, the amount of charging current from a first current prior to the determination to a second current larger than the first current.

The terminal can perform appropriate charging by determining whether a connection destination at the time of charging is a computer or a dedicated power supply apparatus such as a USB adapter. With this structure, the terminal determines whether a signal, such as start of frame (SOF), indicating that data transmission is performed is transmitted. When the terminal determines that the connection destination is a dedicated power supply apparatus, the terminal can perform appropriate charging.

According to a further embodiment of the present invention, there is provided a terminal including a connection portion to be connected to an external device, a battery that receives power from the external device via the connection portion, a detector that detects whether signal lines included in the connector are maintained at predetermined logical states, such as logical high states, a determination unit that determines whether the external device is a dedicated power supply apparatus on the basis of a detection result obtained by the detector, and a controller that controls charging of the battery on the basis of a determination result obtained by the determination unit.

With this structure, appropriate charging can be performed when it is determined, by determining the logical states of the two signal lines, that the communication destination is a dedicated power supply apparatus. For example, appropriate charging can be performed when it is determined, by determining whether both the signal lines are maintained at logical high states, that the communication destination is a dedicated power supply apparatus.

The terminal may further include a current converter that converts, on the basis of determination performed by the determination unit, the amount of charging current from a first current prior to the determination to a second current larger than the first current. The first and second currents are, for example, 100 mA and 500 mA, respectively. With this structure, the amount of current can be increased subsequent to determining that the communication destination is a dedicated power supply apparatus. For example, the amount of current can be increased from 100 mA to 500 mA.

According to still a further embodiment of the present invention, there is provided a power supply system including a dedicated power supply apparatus and a terminal, to which power is supplied from the dedicated power supply apparatus. The dedicated power supply apparatus includes a regulator that receives power from an external power source, two signal lines to which the regulator is connected, and two resistors, each placed between the regulator and an associated one of the two signal lines. The terminal includes a connection portion to be connected to an external device, a battery that receives power from the external device via the connection portion, a detector that detects data from the external device when the connection portion is connected to the external device, a determination unit that determines whether the external device is the dedicated power supply apparatus on the basis of a detection result obtained by the detector, and a controller that controls charging of the battery on the basis of a determination result obtained by the determination unit.

With this system, in the dedicated power supply apparatus, the two signal lines can be pulled up to a predetermined voltage by placing each of the two resistors between the regulator and an associated one of the two signal lines. Accordingly, a device connected to the dedicated power supply apparatus is prevented from being suspended. The terminal determines whether a signal, such as SOF, indicating that data transmission is performed is transmitted. On the basis of the determination result, the terminal determines whether the connection destination device is the dedicated power supply apparatus, such as a USB adapter. Accordingly, the terminal can perform appropriate charging. In this manner, malfunction or unstable operation of the terminal can be suppressed, and a safe charging system can be provided.

According to yet another embodiment of the present invention, there is provided a power supply method for supplying power to a terminal. The power supply method includes the steps of: detecting whether an external device is connected; receiving power from a detected external device and starting charging; detecting a data signal from the external device after starting charging; and controlling the amount of power received from the external device on the basis of a result of detecting the data signal from the external device after starting charging.

With this method, after starting charging, the terminal detects a signal, such as SOF, indicating that the external device performs data transmission. On the basis of the detection result, the terminal controls charging. In this manner, malfunction or unstable operation of the terminal connected to a dedicated power supply apparatus can be suppressed, and a safe charging system can be provided.

According to the embodiments of the present invention, the dedicated power supply apparatus includes the two resistors, each placed between the regulator and an associated one of the two signal lines. Thus, the two signal lines can be pulled up to a predetermined voltage. Also, a device connected to the dedicated power supply apparatus is prevented from being suspended. The terminal determines whether a signal, such as SOF, indicating that data transmission is performed is transmitted. The terminal can perform appropriate charging when it is determined that the communication destination device is the dedicated power supply apparatus, such as a USB adapter. In this manner, malfunction or unstable operation of the terminal can be suppressed, and a safe charging system can be provided.

BRIEF DESCRIPTION OF THE DRAWINGS

FIG. 4 is a table of the verification results of verifying the transitions to the suspended state;

FIG. 10 is a flowchart of another example of a USB adapter detection method.

DESCRIPTION OF THE PREFERRED EMBODIMENTS

Figure 1:
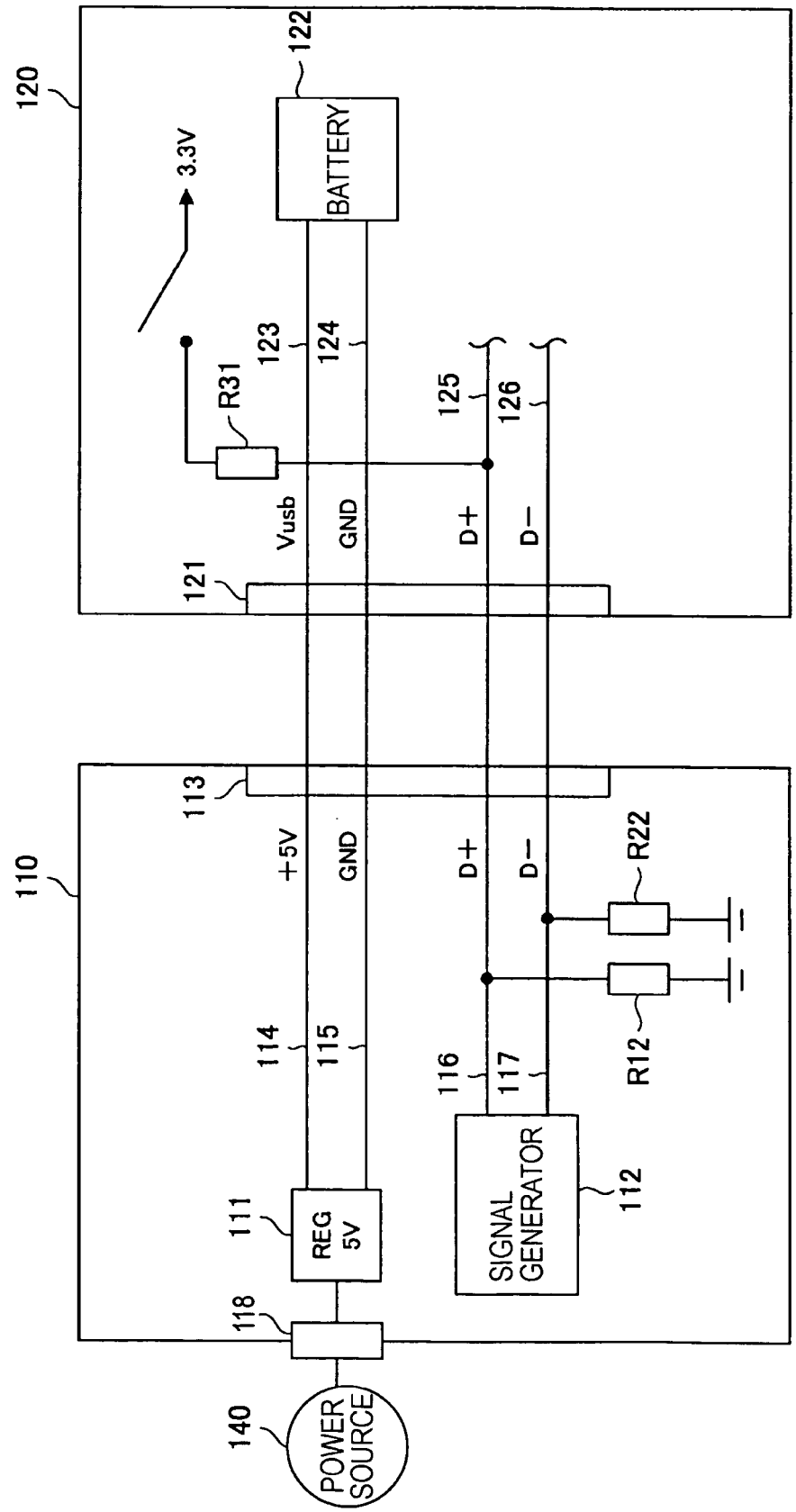
FIG. 1 is a diagram of an example of a connection state when a USB connection is established between a USB adapter and a device.

With reference to the accompanying drawings, a dedicated power supply apparatus, a terminal, a power supply system, and a power supply method according to preferred embodiments of the present invention will be described in detail. In the specification and the drawings, elements that have substantially the same functions are denoted by the same reference numerals, and repeated descriptions thereof will be omitted.

According to an embodiment of the present invention, a dedicated power supply apparatus for charging a battery that is included in a device and can be recharged by establishing a USB connection (hereinafter referred to as a "USB adapter") will be described. In this embodiment, the term "device" refers to a device that can receive power from a computer, which is a USB host, or from the USB adapter by establishing a connection via USB. The device in the embodiment mainly assumes a mobile device that can be carried around. However, the device is not limited to that suitable for being carried around and includes all terminals that can receive power from a USB-connection destination.

In this embodiment, it is desirable to prevent the device from being suspended while connected to the USB adapter. When the computer is suspended while the device is being connected to the computer, the device is also suspended. At this time, the device can only receive a current of about 500 μA, and it is difficult for the device to actually request the computer to supply power to the device.

When the device is connected to the USB adapter, it is not necessary to suspend the device. However, it is difficult for the device to determine whether a connection destination device is a USB device or a computer. Thus, the device may mistakenly recognize a state where the device is being connected to the USB adapter as a state where the device is being connected to the suspended computer. In this embodiment, it is desirable to prevent such erroneous recognition.

FIG. 1 is a diagram of an example of a power supply system. A USB adapter 110, which is an example of the dedicated power supply apparatus, and a device 120, which is an example of the terminal, are connected to each other via USB. The USB adapter 110 is connected via a power plug 118 to an external power source 140. FIG. 1 only shows elements that are necessary for the description below.

USB Adapter 110

The USB adapter 110 includes, as shown in FIG. 1, a regulator 111, (a signal generator 112), and a USB connector 113. The regulator 111 receives a voltage from the external power source 140 and converts the voltage to a voltage that can be used as a charging voltage. The external power source 140 supplies, for example, an AC voltage ranging from 100 V to 240 V for home power supply, and the regulator 111 converts this voltage to, for example, a DC voltage of 5 V. (The signal generator 112 generates a signal for data transmission. It is not necessary to provide the signal generator 112.)

The USB connector 113 is a standard four-pin USB connector and includes a +5V terminal 114, a GND terminal 115, a D+ terminal 116, and a D− terminal 117. The +5V terminal 114 and the GND terminal 115 are power supply terminals to be connected to the regulator 111. The D+ terminal 116 and the D− terminal 117 are data transmission terminals to be connected to the signal generator 112. The D+ terminal 116 is grounded via, for example, a resistor R12 of 15 kΩ. The D− terminal 117 is grounded via, for example, a resistor R22 of 15 kΩ.

Device 120

The device 120 includes, as shown in FIG. 1, a USB port 121 and a battery 122. The USB port 121 is a port to which the USB connector 113 of the USB adapter 110 is connected. The USB port 121 includes a Vusb terminal 123, a GND terminal 124, a D+ terminal 125, and a D− terminal 126. The battery 122 is a rechargeable power source and is, for example, a lithium-ion battery.

Upon connection of the device 120 to the USB adapter 110, the Vusb terminal 123 is connected to the +5V terminal 114 of the USB adapter 110, the GND terminal 124 is connected to the GND terminal 115 of the USB adapter 110, the D+ terminal 125 is connected to the D+ terminal 116 of the USB adapter 110, and the D− terminal 126 is connected to the D− terminal 117 of the USB adapter 110.

The D+ terminal 125 is connected via, for example, a resistor 31 of 1.5 kΩ to a 3.3 V power source and is thereby pulled up. The device 120 shown in FIG. 1 assumes a device, such as a hard disk, that performs full-speed communication. When the device 120 is a device, such as a mouse, that performs low-speed communication, the D− terminal 126 is to be pulled up.

The device 120 recognizes a connection with the USB adapter 110 when +5 V power is supplied from the +5V terminal 114 of the USB adapter 110 to the Vusb terminal 123. In contrast, the USB adapter 110 recognizes a connection with the device 120 when the device 120 pulls up the D+ terminal 116 using the resistor 31.

The case of transition to a suspended state of a device that establishes a USB connection, such as that shown in FIG. 1, will be described. A device that establishes a USB connection, such as that shown in FIG. 1, determines whether a connection destination electronic device, such as a computer, has been suspended. If it is determined that the connection destination electronic device has been suspended, the device is also suspended. When the USB-connection destination is idle for 3 ms or longer and when no SOF or no other signals are sent from the USB-connection destination, the device 120 is suspended. The idle state is a state where, in the case of a low-speed device, the D+ terminal 125 is low and the D− terminal 126 is high, and, in the case of a full-speed device, the D+ terminal 125 is high and the D− terminal 126 is low. In this specification, the logical high state is simply expressed as "high", and the logical low state is simply expressed as "low".

Figure 2:
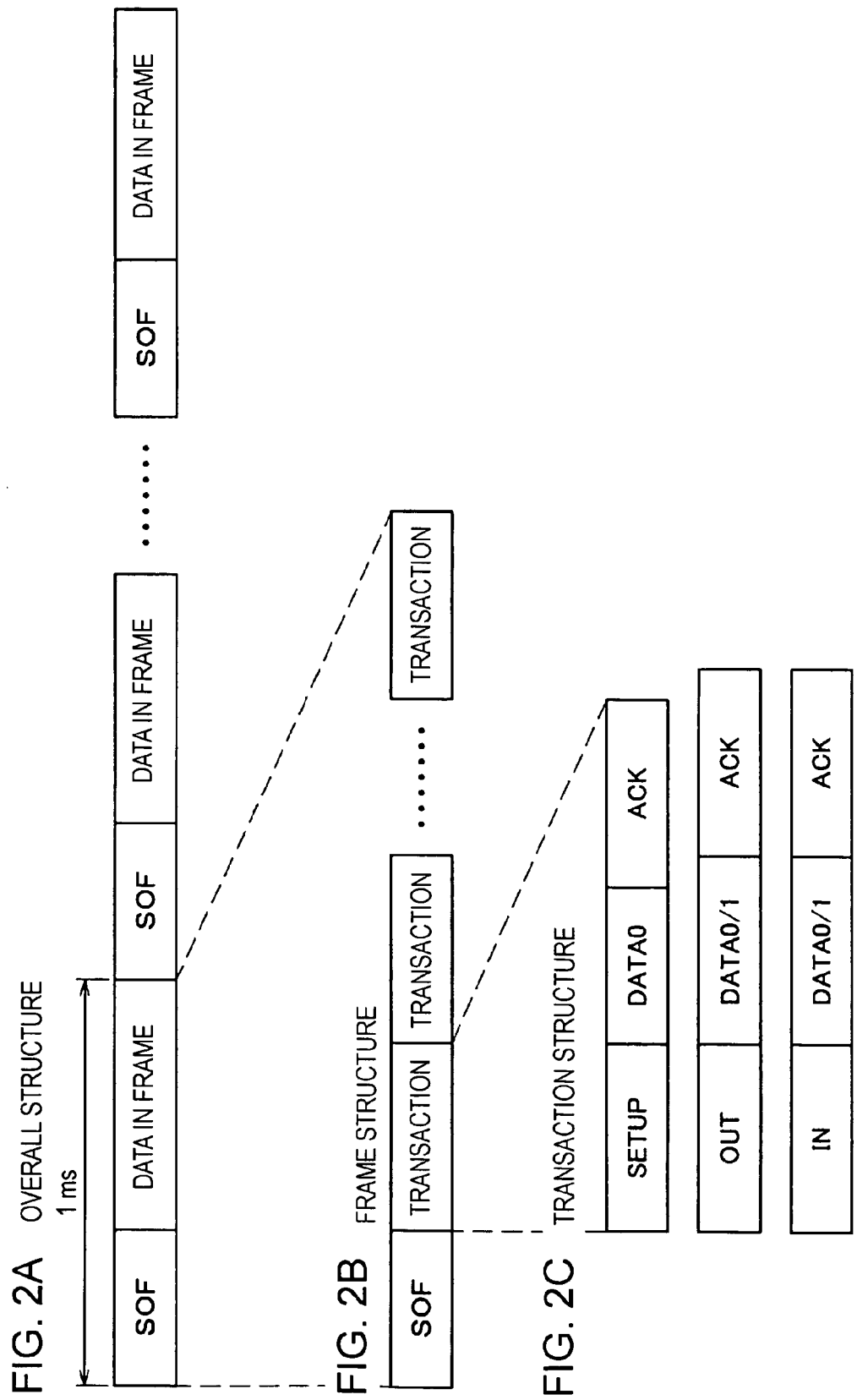
FIG. 2A is a diagram of the overall structure of data to be transferred, including SOF.
FIG. 2B is a diagram of the frame structure of data to be transferred, including SOF.
FIG. 2C is a diagram of the transaction structure of data to be transferred.

The SOF will now be described. FIGS. 2A to 2C are diagrams of the structure of data to be transferred, including SOF. The actual data flowing on a USB line is communicated in units referred to as "frames". A frame is repeatedly transferred with a 1 ms period, as shown in FIG. 2A. All data is exchanged in frames. The frame structure includes, as shown in FIG. 2B, a plurality of "transactions" starting with a "packet" referred to as a "start of frame (SOF)". A packet is a minimum unit communicated in USB communication, and there are a few types of packets. When a few packets are communicated to form a unit of meaningful data transmission, this unit is referred to as a "transaction". As shown in FIG. 2C, there are three types of transactions including SETUP, OUT, and IN. The length of data to be transferred depends on the setting.

Figure 3:
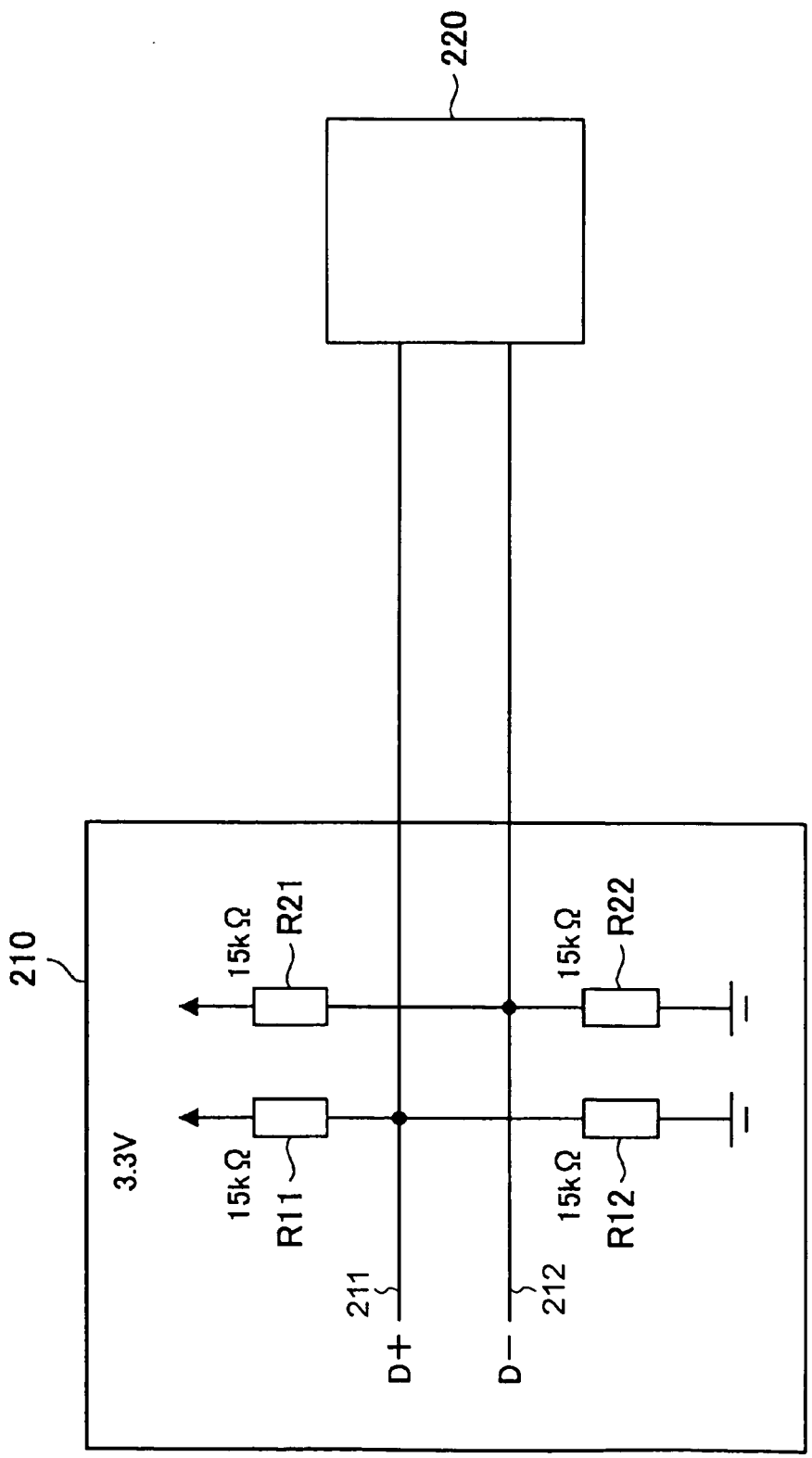
FIG. 3 is a diagram of a verification method of verifying transitions to a suspended state.

As has been described above, by preventing the USB adapter 110 from being idle while the device 120 is being USB-connected to the USB adapter 110, it can be regarded that it is possible to prevent the device 120 from being suspended. As shown in FIG. 3, in a USB adapter 210, it is assumed that resistors R11 and R12 of 15 kΩ are connected to a D+ terminal 211, and resistors R21 and R22 of 15 kΩ are connected to a D− terminal 212. The resistors R11, R12, R21, and R22 are connected and disconnected to verify whether the device 220 becomes suspended.

FIG. 4 is a table of the results of verification performed in FIG. 3. Which resistors are connected to the D+ terminal 211 and the D− terminal 212 is determined by various viewpoints, such as preventing the USB adapter 210 from being suspended, preventing the D+ terminal 211 and the D− terminal 212 from presenting high impedance, and preventing unnecessary leakage current. In the states of the D+ terminal 211 and the D− terminal 212 indicated by rows A, B, C, D, and E of the table shown in FIG. 4, it is difficult to prevent the D+ terminal 211 and the D− terminal 212 from presenting high impedance. In the states of the D+ terminal 211 and the D− terminal 212 indicated by rows G, H, and I, the device 220 mistakenly recognizes that the USB adapter 210 is idle. It is thus difficult to prevent the device 220 from being suspended. For example, row H indicates the case where the D+ terminal 211 is low and the D− terminal 212 is high. In this case, the device 220 mistakenly determines that the connection destination USB adapter 210 is a low-speed device and is idle. However, in the states of the D+ terminal 211 and the D− terminal 212 indicated by row F, the D+ terminal 211 and the D− terminal 212 do not present high impedance, and the device 220 is not suspended. Therefore, it has been verified that it is optimal to connect the resistors R11 and R12 to the D+ terminal 211 and the D− terminal 212, respectively, to pull up both the D+ terminal 211 and the D− terminal 212. The pull-up voltage is, for example, 3.3 V. By pulling up both the D+ terminal 211 and the D− terminal 212, the device 220 connected to the USB adapter 210 is prevented from being suspended.

Figure 5:
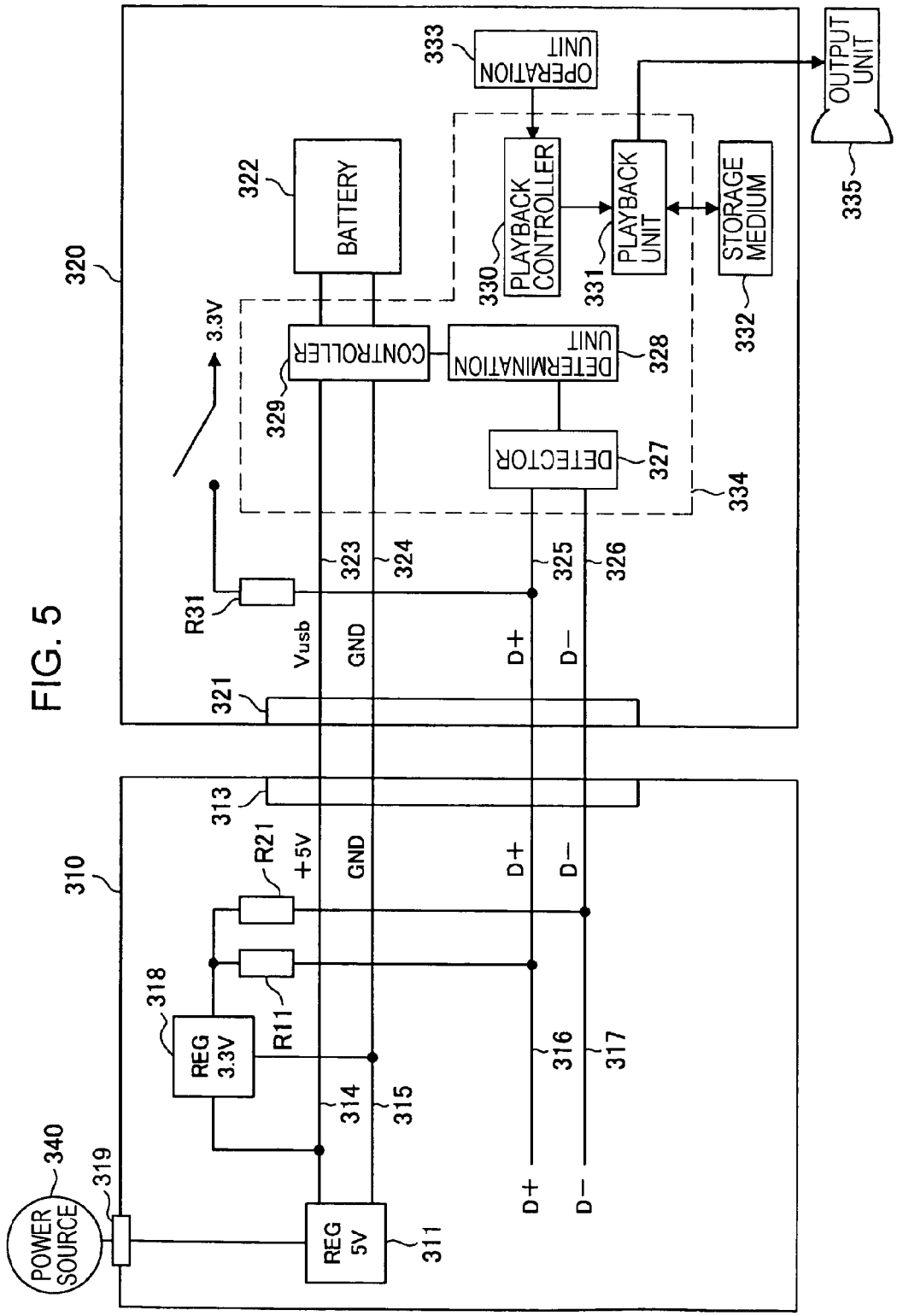
FIG. 5 is a diagram of a power supply system according to an embodiment of the present invention.

FIG. 5 is a diagram of a power supply system according to an embodiment of the present invention and shows a USB connection between a USB adapter 310, which is an example of the dedicated power supply apparatus, and a device 320, which is an example of the terminal. The USB adapter 310 is connected via a power plug 319 to an external power source 340. FIG. 5 only shows elements that are necessary for the description below.

USB Adapter 310

The USB adapter 310 includes, as shown in FIG. 5, a regulator 311 and a USB connector 313. The regulator 311 receives a voltage from the external power source 340 and converts the voltage to a voltage that can be used as a charging voltage. The external power source 340 supplies, for example, an AC voltage ranging from 100 V to 240 V for home power supply, and the regulator 311 converts this voltage to, for example, a DC voltage of 5 V.

The USB connector 313 is a standard four-pin USB connector and includes a +5V terminal 314, a GND terminal 315, a D+ terminal 316, and a D− terminal 317. The +5V terminal 314 and the GND terminal 315 are power supply terminals to be connected to the regulator 311. The D+ terminal 316 and the D− terminal 317 are data transmission terminals, which will be described subsequently.

The USB adapter 310 shown in FIG. 5 is different from the USB adapter 110 shown in FIG. 1 in that, for example, the D+ terminal 316 is connected to a regulator 318 via, for example, the resistor R11 of 15 kΩ, and the D− terminal 317 is connected to the regulator 318 via, for example, the resistor R21 of 15 kΩ. The regulator 318 receives a voltage from the +5 terminal 314 and the GND terminal 315, which are power supply terminals, and converts this voltage to, for example, 3.3 V. Thus, the D+ terminal 316 and the D− terminal 317, which are data transmission terminals, can be pulled up to 3.3 V. The USB adapter 310 includes no signal generator 112 shown in FIG. 1, and the resistors R11 and R12 are connected to the D+ terminal 316 and the 317, respectively.

In this embodiment, the case where the D+ terminal 316 and the D− terminal 317 are pulled up to 3.3 V is described by way of example. However, the present invention is not limited to this case. Alternatively, the D+ terminal 316 and the D− terminal 317 may be pulled up to an arbitrary voltage, such as 1.5 V or 15 V.

In this embodiment, the case where both the D+ terminal 316 and the D− terminal 317 are pulled up is described by way of example. However, the present invention is not limited to this case. Alternatively, a low-speed device can be handled by pulling up the D+ terminal 316 of the USB adapter 310, and a full-speed device can be handled by pulling up the D− terminal 317 of the USB adapter 310. At present, most USB devices are full-speed devices, and it is expected that this trend will continue in the future. In the case where a full-speed device is to be handled and no low-speed device is taken into consideration, only the D− terminal 317 of the USB adapter 310 may be pulled up.

As has been described above, according to the USB adapter 310 according to the embodiment, the D+ terminal 316 and the D− terminal 317 of the USB adapter 310 are pulled up. Thus, the device 320 is prevented from being suspended, which may be caused by the device 320 mistakenly recognizing that the USB adapter 310 has been suspended.

Next, the device will be described. The structure of the device 120 shown in FIG. 1 does not enable the device 120 to determine whether the USB connection destination is a computer or a USB adapter. Basically, the USB standard does not allow the current supply to the device 120 to be increased from 100 mA to 500 mA unless permission is obtained from a computer serving as the connection destination. However, when the connection destination is a USB adapter, it is not necessary for the device 120 to obtain permission from the USB adapter. Thus, when it is necessary to quickly charge the device 120 by receiving a current of 500 mA, it is necessary for the device 120 to detect whether the USB connection destination is a USB adapter or a computer. Hereinafter, how this point can be accomplished will be described.

It is only necessary for the device 320 to determine whether the USB connection destination is a computer or a USB adapter. When the USB connection destination is a computer, the device 320 can receive a current of 500 mA after obtaining permission from the computer. When the USB connection destination is a USB adapter, the device 320 can receive a current of 500 mA without obtaining permission from the USB adapter. Hereinafter, the structure of the device based on this viewpoint will be described.

Device 320

The device 320 includes, as shown in FIG. 5, a USB port 321 and a battery 322. The USB port 321 is a port to which the USB connector 313 of the USB adapter 310 is connected. The USB port 321 includes a Vusb terminal 323, a GND terminal 324, a D+ terminal 325, and a D− terminal 326. The battery 322 is a rechargeable power source and is, for example, a lithium-ion battery.

Upon connection of the device 320 to the USB adapter 310, the Vusb terminal 323 is connected to the +5V terminal 314 of the USB adapter 310, the GND terminal 324 is connected to the GND terminal 315 of the USB adapter 310, the D+ terminal 325 is connected to the D+ terminal 316 of the USB adapter 310, and the D− terminal 326 is connected to the D− terminal 317 of the USB adapter 310.

The D+ terminal 325 is connected via, for example, the resistor 31 of 1.5 kΩ to the 3.3 V power source and is thereby pulled up. The device 320 shown in FIG. 5 assumes a full-speed device, such as a hard disk. When the device 320 is a low-speed device, such as a mouse, the D− terminal 326 is to be pulled up.

The device 320 recognizes a connection with the USB adapter 310 when +5 V power is supplied from the +5V terminal 314 of the USB adapter 310 to the Vusb terminal 323. In contrast, the USB adapter 310 recognizes a connection with the device 320 when the device 320 pulls up the D+ terminal 316 using the resistor 31.

The device 320 shown in FIG. 5 further includes a detector 327, a determination unit 328, a controller 329, a playback controller 330, a playback unit 331, a storage medium 332, and an operation unit 333. The detector 327 is connected to the D+ terminal 325 and the D− terminal 326 for data transmission. When the USB port 321 is connected to an external device such as the USB adapter 310 or a computer, the detector 327 detects a signal indicating that the external device performs data transmission. The determination unit 328 is connected to the detector 327 and determines whether the external device is the USB adapter 310 on the basis of the detection result obtained by the detector 327.

The controller 329 is connected to the determination unit 328, the Vusb terminal 323 and the GND terminal 324 for power supply, and the battery 322. The controller 329 controls the charging of the battery 322 on the basis of the determination result obtained by the determination unit 328.

The playback controller 330 receives a command from the operation unit 333 and controls the playback unit 331. The playback unit 331 plays back an audio file, such as an MP3 file, stored on the storage medium 332. Also, the playback unit 331 may be capable of playing back, in addition to audio files, files including images, moving images, and text. An output unit 335 outputs the audio file or the like played back by the playback unit 331. The output unit 335 may be placed inside or outside the device 320.

The detector 327, the determination unit 328, the controller 329, the playback controller 330, and the playback unit 331 may be implemented as functions of a central processing unit (CPU) 334. Each function of the CPU 334 mainly consumes power charged in the battery 322 when executing processing.

There are three methods of the detector 327 of the device 320 determining whether the USB connection destination is a computer or a USB adapter, which will be described subsequently.

(1) SOF Signal Detection

When a device connected via USB to the device is a computer, the computer sends SOF to the device once in every predetermined period of time. The predetermined period of time is, for example, 1 ms. In contrast, because the USB adapter will not be in a suspended mode, the USB adapter sends no SOF to the device. Thus, when no SOF is sent from the USB connection destination within the predetermined period of time or longer, the device can determine that the connection destination is a USB adapter.

Figure 6:
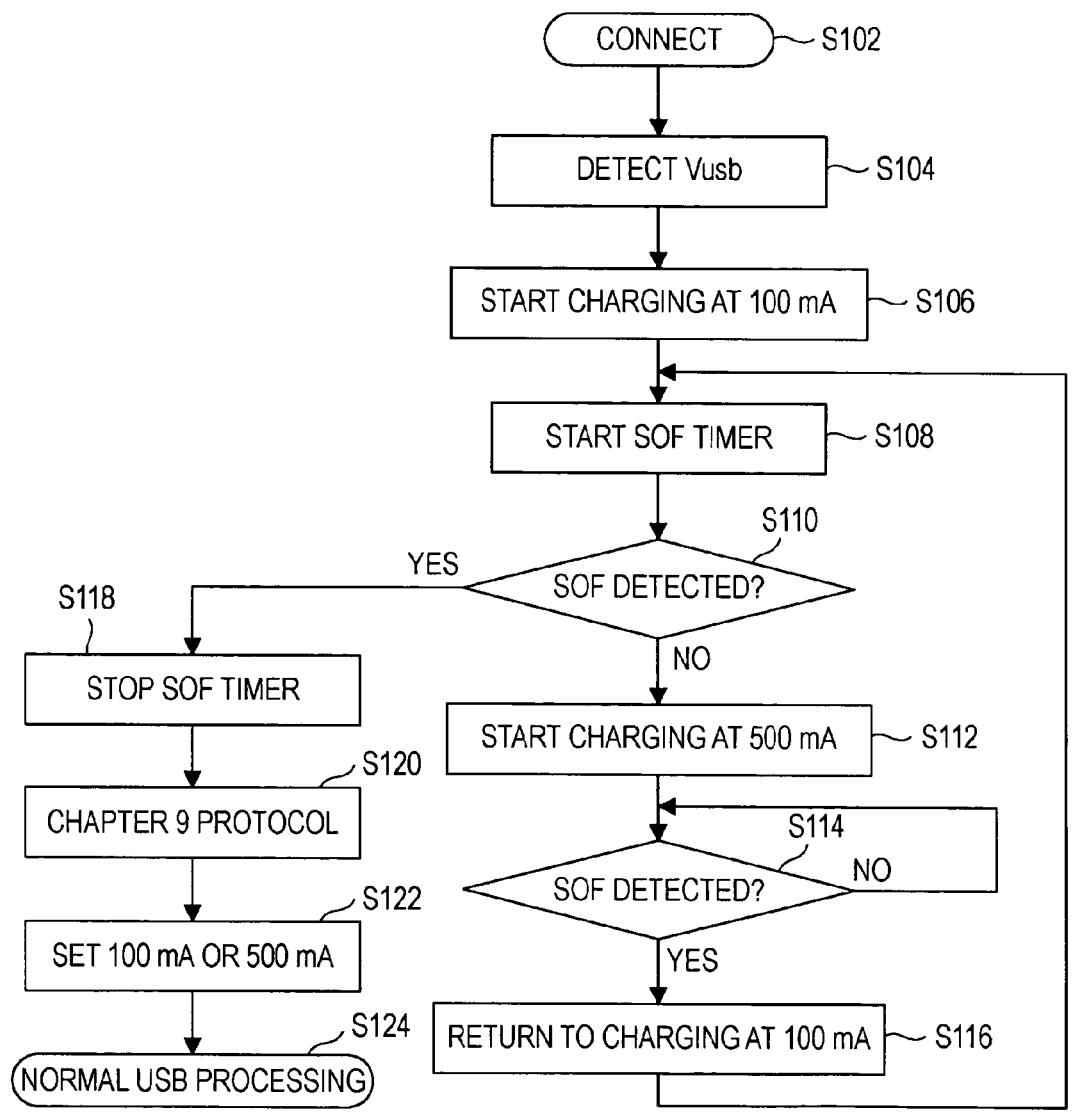
FIG. 6 is a flowchart of a first USB adapter detection method.

The flow of USB adapter detection will now be described with reference to FIG. 6. The USB connection destination will be referred to as the "external device", which is, for example, a USB adapter or a computer.

In step S102, the device 320 is connected to the external device. In step S104, the device 320 recognizes a connection with the external device when the external device supplies +5 power to the Vusb terminal 323. In step S106, the device 320 starts charging at 100 mA. In step S108, the device 320 starts an SOF queue timer. In step S110, the device 320 determines whether SOF is detected within the predetermined period of time.

If no SOF was detected and time ran out in step S110, in step S112, the device 320 recognizes that the USB connection destination is a USB adapter and starts charging at 500 mA. In step S114, after starting charging at 500 mA, the device 320 again determines whether SOF is detected within the predetermined period of time. If SOF is detected, in step S116, the device 320 determines that there was a mistake in recognition of the USB connection destination, and the device 320 returns to charging at 100 mA.

If SOF is detected in step S110, in step S118, the device 320 recognizes that the USB connection destination is a computer. The device 320 stops the SOF timer upon reception of even one command from the computer. In step S120, the computer executes the "Chapter 9 Protocol" handling to recognize a terminal connected thereto. In step S122, the device 320 sets whether to receive a current of 100 mA or a current of 500 mA after obtaining permission from the computer. In step S124, the device 320 performs the normal USB processing.

(2) Signal Line D+/D− Logical State Detection

A second method of the detector 327 of the device 320 determining whether the USB connection destination is a computer or a USB adapter will now be described.

According to the second method, the detector 327 of the device 320, which is connected to the D+ terminal 325 and the D− terminal 326 for data transmission, has a function of determining whether the signal lines D+ and D− are maintained at predetermined logical states. The remaining portions are the same as those shown in FIG. 5.

Figure 7:
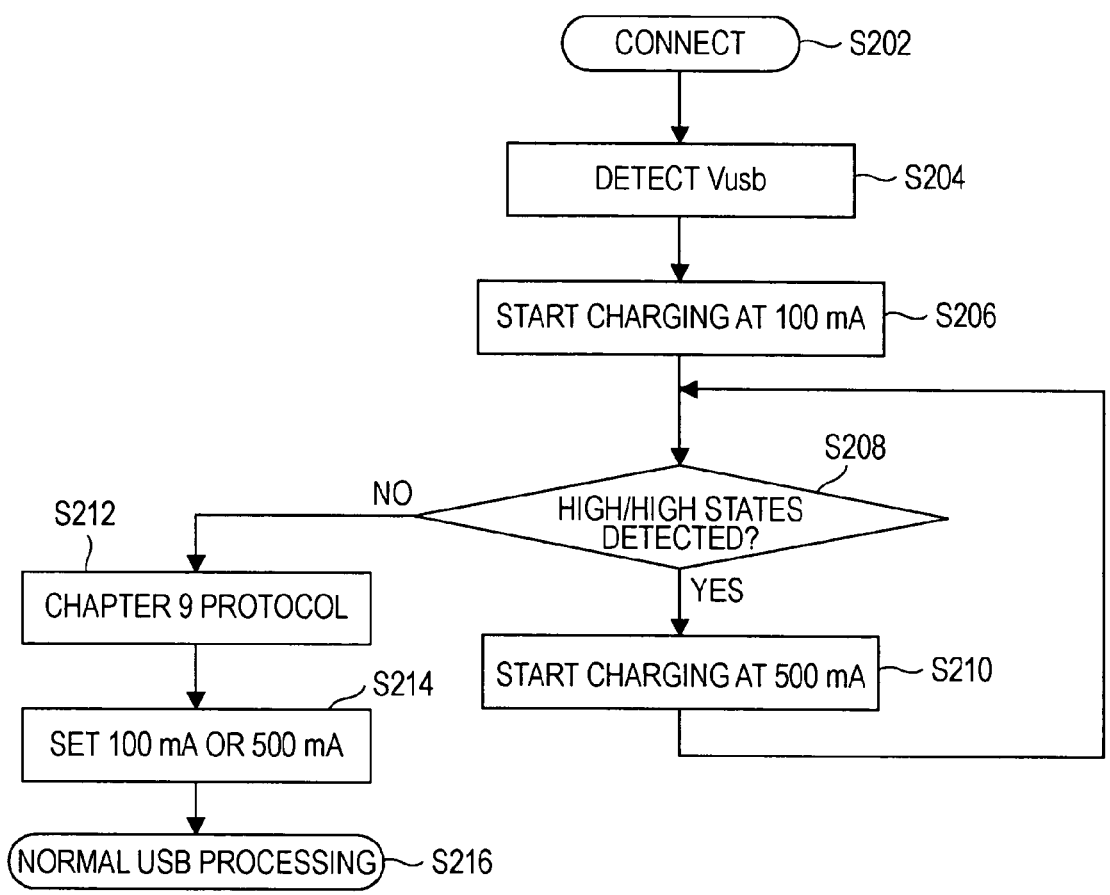
FIG. 7 is a flowchart of a second USB adapter detection method.

The flow of USB adapter detection will now be described with reference to FIG. 7.

In step S202, the device 320 is connected to the external device. In step S204, the device 320 recognizes a connection with the external device when the external device supplies +5 power to the Vusb terminal 323. In step S206, the device 320 starts charging at 100 mA.

In step S208, the device 320 detects the states of the signal lines D+ and D− using the detector 327. The device 320 determines whether the signal lines D+ and D− are maintained at high/high states on the basis of the detection result.

If it is determined in step S208 that the signal lines D+ and D− are maintained at high/high states, in step S210, the device 320 recognizes that the USB connection destination is a USB adapter and starts charging at 500 mA.

In contrast, if it is determined in step S208 that the signal lines D+ and D− are not maintained at high/high states, in step S212, the device 320 recognizes that the USB connection destination is a computer. The computer executes the "Chapter 9 Protocol" handling to recognize a terminal connected thereto. In step S214, the device 320 sets whether to receive a current of 100 mA or a current of 500 mA after obtaining permission from the computer. In step S216, the device 320 performs the normal USB processing.

(3) SOF Signal Detection and D+/D− Logical State Detection

A third method of the detector 327 of the device 320 determining whether the USB connection destination is a computer or a USB adapter will now be described.

According to the third method, the detector 327 of the device 320, which is connected to the D+ terminal 325 and the D− terminal 326 for data transmission, has two functions. One is to detect an SOF signal, and the other is to determine whether the signal lines D+ and D− are maintained at predetermined logical states. The remaining portions are the same as those shown in FIG. 5.

Figure 8:
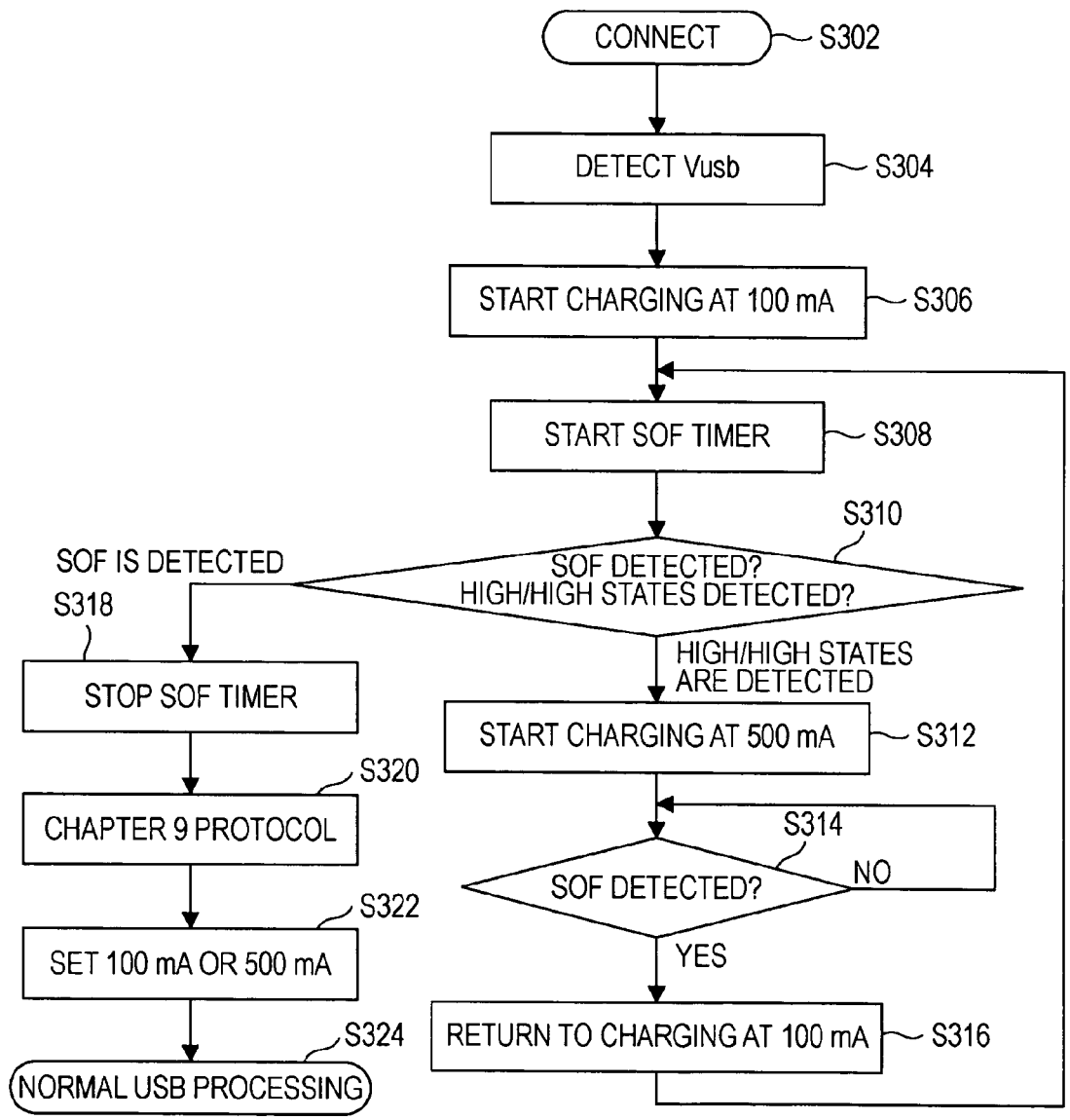
FIG. 8 is a flowchart of a third USB adapter detection method.

The flow of USB adapter detection will now be described with reference to FIG. 8.

In step S302, the device 320 is connected to the external device. In step S304, the device 320 recognizes a connection with the external device when the external device supplies +5 power to the Vusb terminal 323. In step S306, the device 320 starts charging at 100 mA.

In step S308, the device 320 starts the SOF queue timer. In step S310, the device 320 determines whether SOF is detected within the predetermined period of time. In addition, the device 320 detects the states of the signal lines D+ and D− and determines whether the signal lines D+ and D− are maintained at high/high states.

If it is determined in step S310 that the signal lines D+ and D− are maintained at high/high states, in step S312, the device 320 recognizes that the USB connection destination is a USB adapter and starts charging at 500 mA. In step S314, after starting charging at 500 mA, the device 320 again determines whether SOF is detected within the predetermined period of time. If SOF is detected, in step S316, the device 320 determines that there was a mistake in recognition of the USB connection destination, and the device 320 returns to charging at 100 mA.

If SOF is detected in step S310, in step S318, the device 320 recognizes that the USB connection destination is a computer. The device 320 stops the SOF timer upon reception of even one command from the computer. In step S320, the computer executes the "Chapter 9 Protocol" handling to recognize a terminal connected thereto. In step S322, the device 320 sets whether to receive a current of 100 mA or a current of 500 mA after obtaining permission from the computer. In step S324, the device 320 performs the normal USB processing.

According to the third method, the device performs both the SOF signal detection and the D+/D− logical state detection. It thus becomes unnecessary for the device to continue detecting SOF until the time of the SOF timer runs out. In this manner, the period of time for determining whether the USB connection destination is a computer or a USB adapter can be reduced.

As has been described above, the device 320 according to this embodiment includes the detector 327, the determination unit 328, and the controller 329. The device 320 can determine whether the USB connection destination is a computer or a USB adapter. Thus, even when it is necessary to quickly charge the device 320, optimal charging can be performed.

The case where the device 320 mistakenly detects a USB adapter when any one of the methods according to this embodiment is used will now be described. When the device 320 mistakenly detects that the USB connection destination is a USB adapter, the device 320 changes the current limit from 100 mA to 500 mA. When the USB connection destination is capable of supplying a current of 500 mA or greater, no significant problems will be caused. For example, when the USB connection destination is a root hub, the root hub is capable of supplying a current of 500 mA or greater. However, when the USB connection destination is a bus-powered hub, the bus-powered hub is capable of only supplying a current of 100 mA. As long as power is supplied to the bus-powered hub, the bus-powered hub outputs SOF regardless of the host state. Thus, the device will not mistakenly detect a USB adapter. Even when the device mistakenly detects a USB adapter, no significant negative impact will be caused.

Although the dedicated power supply apparatus, the terminal, the power supply system, and the power supply method according to the preferred embodiment of the present invention have been described with reference to the accompanying drawings, the present invention is not limited thereto. It is anticipated by those skilled in the art that a variety of modifications or changes may be made without departing from the technical scope of the invention set forth in the appended claims, and these modifications or changes may also be embraced in the scope of the present invention.

Figure 9:
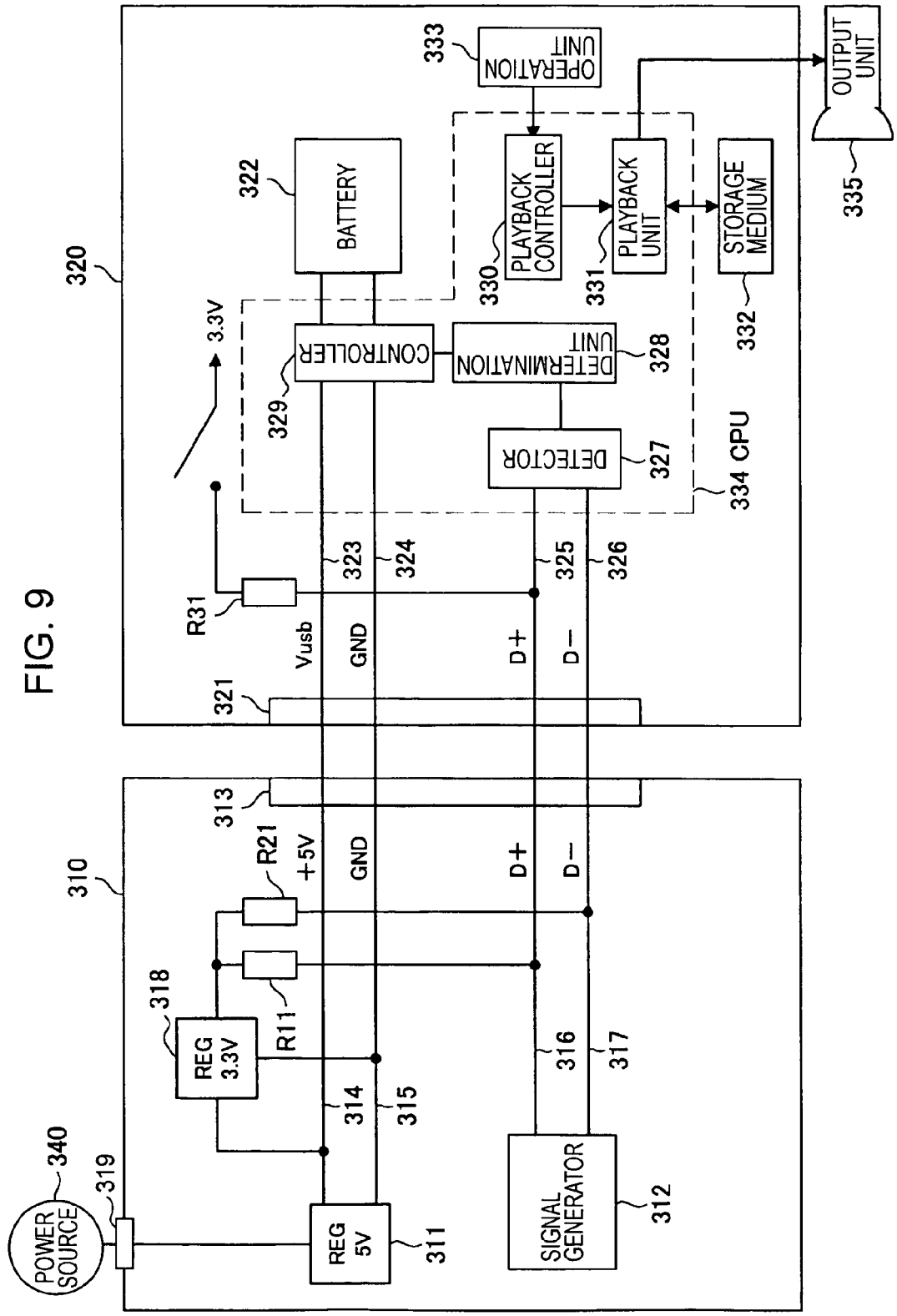
FIG. 9 is a diagram of a power supply system according to another embodiment of the present invention.

For example, in the above-described embodiment, the USB adapter, which includes no signal generator but includes the D+ terminal 316 and the D− terminal 317 connected to the resistors R11 and R21, has been described. However, the present invention is not limited thereto. For example, as shown in FIG. 9, a signal generator 312 for generating a signal for data transmission may be provided.

In "(3) SOS Signal Detection and Signal Line D+/D− Logical State Detection" in the above-described embodiment, the case where the SOS signal detection and the D+/D− logical state detection are performed in parallel with each other has been described. However, the present invention is not limited to this case. For example, a process shown in FIG. 10 may be performed.

In the example shown in FIG. 10, steps S302, S304, S306, S308, S312, S314, S316, S318, S320, S322, and S324 are such as those described above. Steps S309 and S311 will now be described. In step S309, the device 320 determines whether SOF is detected within the predetermined period of time. If SOF is detected, the device 320 determines that the USB connection destination is a computer. When no SOF was detected and time ran out, in step S311, the device 320 further detects the states of the signal lines D+ and D− and determines whether the logical states of the signal lines D+ and D− are maintained at high/high states. If the logical states of the signal lines D+ and D− are maintained at high/high states, the device 320 determines that the device connected thereto via USB is a USB adapter. If the logical states of the signal lines D+ and D− are not maintained at high/high states, the device 320 determines that the device connected thereto via USB is a computer.

The SOF detection in step S309 and the high/high state detection in step S311 may be performed in the opposite order. Also, the series of processes may be performed by hardware by implementing the functional blocks shown in FIGS. 5 and 9 using hardware.

Accordingly, the present invention can be employed in a dedicated power supply apparatus, a terminal, a power supply system, and a power supply method. In particular, the present invention can be employed in a dedicated power supply apparatus, a terminal, a power supply system, and a power supply method applicable to a mobile device that can be carried around, such as an audio player, a mobile phone, a digital camera, a camcorder, a portable game console, or a notebook computer. Also, the present invention is applicable to a dedicated power supply apparatus, a terminal, a power supply system, and a power supply method using not only a USB connector but also any type of connector for both data transmission and power supply.

What is claimed is:

1. A physical processor connected to an electronic device, the electronic device including a rechargeable battery, a connector, a storage medium, and an operation unit, the processor being configured to:
    detect, by the physical processor, a connection between the electronic device and an external device;
    control, by the physical processor, charging of the rechargeable battery so that the rechargeable battery is charged by a first predetermined current from the external device;
    determine, by the physical processor, whether the external device is a predetermined power supply apparatus based on a state of two signal pins of the connector when the external device is connected to the electronic device via the connector;
    control, by the physical processor, communication with the external device via the connector so that the rechargeable battery is charged by
        a second predetermined current from the external device when the external device is determined to be the predetermined power supply apparatus, the second predetermined current being greater than the first predetermined current; or
        the first redetermined current or the second redetermined current from the external device when the external device is determined not to be the predetermined power supply apparatus; and
    control, by the physical processor, to playback content data stored in the storage medium based on a command from the operation unit by using power of the rechargeable battery.

2. The processor according to claim 1, wherein the processor determines that the external device is the predetermined power supply apparatus when the two signal pins are shorted with each other.

3. The processor according to claim 2, wherein the electronic device further comprises a regulator coupled to the two signal pins.

4. The processor according to claim 1, wherein the processor determines that the external device is the predetermined power supply apparatus when the two signal pins are floated.

5. The processor according to claim 1, wherein the processor determines that the external device is the predetermined power supply apparatus when logical statuses of the two signal pins are high.

6. The processor according to claim 1, wherein the connector includes a power supply pin, a ground pin, and the two signal pins.

7. The processor according to claim 1, wherein the rechargeable battery comprises a Lithium ion battery.

8. The processor according to claim 1, wherein the first predetermined current is about 100 mA and the second predetermined current is about 500 mA.

9. The processor according to claim 1, wherein the content data comprises a MP3 file.

10. The processor according to claim 1, wherein the connector complies with a USB 2.0 Standard.

11. The processor according to claim 1, wherein the predetermined apparatus is a dedicated charging apparatus.

12. The processor according to claim 1, wherein the processor is configured to detect the connection between the electronic device and the external device when the processor detects a voltage signal from the connector.

* * * * *